US008611874B2

(12) United States Patent
Shaffer et al.

(10) Patent No.: US 8,611,874 B2
(45) Date of Patent: Dec. 17, 2013

(54) AUTOMATED MOBILE INTELLIGENT CALL PROCESSING SYSTEM

(75) Inventors: James D. Shaffer, San Diego, CA (US); Gregory Lowell Greenberg, San Diego, CA (US); Alan Charles Burye, Jr., San Diego, CA (US); Robert B. Hinkley, Rochester, NY (US); Craig Steven Schmackpfeffer, Rochester, NY (US)

(73) Assignee: Neustar Information Services, Inc., Sterling, VA (US)

(*) Notice: Subject to any disclaimer, the term of this patent is extended or adjusted under 35 U.S.C. 154(b) by 499 days.

(21) Appl. No.: 12/198,573

(22) Filed: Aug. 26, 2008

(65) Prior Publication Data

US 2010/0056119 A1 Mar. 4, 2010

(51) Int. Cl.
*H04M 3/42* (2006.01)

(52) U.S. Cl.
USPC ...... 455/415; 455/406; 455/412.2; 455/414.2

(58) Field of Classification Search
USPC .................. 455/415, 412.1, 414.2, 406–408
See application file for complete search history.

(56) References Cited

U.S. PATENT DOCUMENTS

| | | | |
|---|---|---|---|
| 4,757,267 A | 7/1988 | Riskin | |
| 6,353,664 B1 | 3/2002 | Cannon et al. | |
| 6,714,639 B1 | 3/2004 | Bedingfield et al. | |
| 6,944,761 B2 * | 9/2005 | Wood et al. | 713/155 |
| 6,954,526 B1 | 10/2005 | Glenn et al. | |
| 6,985,572 B2 | 1/2006 | Gosselin | |
| 7,170,984 B2 | 1/2007 | Gosselin | |
| 7,200,211 B1 | 4/2007 | Lemke | |
| 7,200,212 B2 | 4/2007 | Gosselin | |
| 7,248,677 B2 * | 7/2007 | Randall et al. | 379/93.23 |
| 7,269,249 B2 | 9/2007 | Woodring | |
| 7,373,335 B2 | 5/2008 | Cleghorn et al. | |
| 2004/0214554 A1 * | 10/2004 | Binning et al. | 455/414.1 |
| 2005/0250483 A1 * | 11/2005 | Malik | 455/415 |
| 2006/0046720 A1 * | 3/2006 | Toropainen et al. | 455/434 |
| 2007/0211873 A1 * | 9/2007 | Wang | 379/142.01 |
| 2008/0242293 A1 | 10/2008 | Gosselin | |
| 2009/0253414 A1 | 10/2009 | Gosselin et al. | |
| 2009/0257575 A1 | 10/2009 | Gosselin et al. | |
| 2010/0075644 A1 | 3/2010 | Gosselin et al. | |

FOREIGN PATENT DOCUMENTS

WO   WO2007006654   1/2007

OTHER PUBLICATIONS

International Search Report and Written Opinion issued Apr. 20, 2010 in PCT/US2009/054943, 11 pages.

(Continued)

*Primary Examiner* — Vladimir Magloire
(74) *Attorney, Agent, or Firm* — Procopio, Cory, Hargreaves & Savitch, LLP (57) ABSTRACT

A system and method for providing enhanced information to a mobile telephone regarding a calling device is described. The system and method includes receiving an incoming call request at a mobile telephone including the identifier of the calling device. An information request is then formulated including the identifier of the calling device. The information request is transmitted from the mobile phone to the query processing center via a data communication channel. A response is then obtained from the data processing center and transmitted to the mobile phone via the data communication channel. The response received from the data processing center includes the requested information related to the calling device.

23 Claims, 5 Drawing Sheets

(56) References Cited

OTHER PUBLICATIONS

Bellcore (Bell Communications Research), "CLASS Feature: Calling Name Delivery Generic Requirements," Technical Reference No. TR-NWT-001188, Issue 1, Dec. 1991, A Module of "LSSGR: LATA Switching Systems Generic Requirements," No. FR-NWT-000064 (FSD 01-02-1070), 103 pages.

Gallagher "SCP Configuration," Aug. 3, 1998, Targus Information Corporation PowerPoint presentation, 5 pages.
IGR, "Mobile Caller ID: A Balance of Privacy and Profitability," Nov. 2007, White Paper, 17 pages.
Targus Information Corporation, "Addresses in a Box Application Programming Interface," Apr. 22, 1998, Version 1.101, 32 pages.
Yi, "CNAP Specification and Validation: A Design Methodology Using LOTOS and UCM," Jan. 2000, University of Ottawa Master's Thesis, 122 pages.

* cited by examiner

AUTOMATED MOBILE INTELLIGENT CALL PROCESSING SYSTEM

FIELD OF THE INVENTION

This invention relates to mobile telephone services and to a system and method for providing enhanced information to mobile devices and to providing information regarding a calling party to a mobile telephone.

BACKGROUND OF THE INVENTION

Since the beginning of civilization there has been an interest in acquiring information of human traffic to and from a territory. This is illustrated by watch towers, peep holes in doors and other devices used to gather information on an unannounced caller, for example. Over the last 50 years telephone networks have been used as a source of obtaining information about people. For example, in the United States, PSTN (Public Switched Telephone Network) has evolved from operators announcing callers to more automated systems like ANI (automatic Number Identification), Caller ID, CNAM (National Caller Name) and CNAP (Calling Name Presentation) that provide information about a caller to a called party.

Wireless programmable communication devices such as mobile phones, PDAs, including Mobile PCs, Black Berry's and iPhones, are used in conjunction with communication networks to provide caller identification information, for example telephone number, IP address or e-mail address. The caller identification information can be stored on a database, for example address books, of the wireless programmable communication devices. A network passed id of the caller device can be used to access the database stored on the mobile devices for accessing information on previous or known callers who can now be identified by name, picture or other identifiers means that is less cryptic than the telephone number or the network address id of the caller device.

Several milestones in the telecommunications industry, for example, the breakup of AT&T in 1984, further deregulation due to the Telecom Act of 1996 and the recent proliferation of multiple network types have resulted in a failure to provide adequate information about a calling party to a called party. Several new carriers and new service providers have evolved with varying technology and standards such that the information available to the called party about the calling party via their carrier or network provider is currently not always available and varies in quality.

Today from a practical perspective, the information available to a called party related to a calling party is a function of both parties devices, carriers/service providers, type of networks as well as the direct or indirect business relationship between the calling party's carrier/service provider and the called party's carrier/service provider.

Accordingly, there is a need for a system/method for a smart device with a network connection to identify a calling party that is independent of the information stored on their device and independent of information that that can only be licensed from their carrier and/or network service provider.

SUMMARY

The present invention includes methods, apparatuses, and systems as described in the written description and claims. In one embodiment, a method for providing enhanced information to a mobile telephone regarding a calling device includes the steps of receiving an incoming call request at a mobile telephone including an identifier of the calling device (e.g. telephone number). The method also includes formulating an information request including the telephone number or other identifier of the calling party or the calling device 110 and transmitting the information request from the mobile telephone to a query processing center via a data communication channel. A response including the requested information is then received via a data communication channel at the mobile telephone. The requested information can include customized information related to the calling party or the calling device 110. In some embodiments the information related to the telephone number of the calling device may be displayed or stored on the mobile telephone.

In another embodiment, a method of providing enhanced information to a mobile telephone regarding a calling device wherein the mobile telephone receives the telephone number of a calling device is described. The method includes receiving a request for information from a mobile telephone over a data communication channel where the request includes a telephone number of the calling device. The telephone number of the calling device can be used to access a database and obtain the requested information. The method also includes transmitting the requested information obtained to the mobile telephone via the data communication channel while the mobile telephone is connected to the calling device. In some embodiments the requested information can be associated with the calling party's telephone number via an algorithm that computes the location in memory of the requested information. The method can also include accessing a verification file or table to authenticate the source of the request.

Additionally, a method for providing enhanced information to a mobile telephone regarding a calling party or calling device 110 is described. The method includes the step of receiving an incoming call request at a mobile telephone including the telephone number of the calling device. The method also includes formulating an information request including the telephone number of the calling device and transmitting the information request from the mobile telephone to a query processing center via a data communication channel. The request for information is then received from the mobile telephone over the data communication channel. The telephone number of the calling device can be used to access a database and obtain the requested information. The requested information may include the customized information associated with the calling device. In addition the method includes transmitting the requested information obtained to the mobile telephone via the data communication channel while the mobile telephone is connected to the calling device. A response including the requested information is then received via a data communication channel at the mobile telephone.

In yet another embodiment an automated mobile intelligent call processing system is described. The system can include a storage device for storing telecommunications carrier independent records associated with multiple telephone numbers. The system also includes an information gateway module coupled to the storage device and configured to receive a request for information from a mobile telephone over a data communication channel. The request may include a telephone number of a calling device. An information application module may also be coupled to the storage device and to the information gateway module. The information application module may be configured to receive the telephone number from the information gateway module and to access the storage device to obtain the information requested. The requested information obtained from the storage device may include the customized information relating to the calling device. The system can also include a communication module coupled to the information application module and configured to transmit the requested information relating to the calling device via the data communication channel. The information gateway module can be further configured to access a verification table to authenticate the source of the request.

In addition, a mobile device for providing enhanced information to a user regarding a calling device is described. The mobile device may include a telephony controller, Application Programming Interface (API) module, a data controller and a query module. The telephony controller receives an incoming call request from a calling device. The API module obtains notification of the incoming call request including the telephone number of the calling device. The API module can also forward the notification of the call. The call notification may include the telephone number of the calling device. The data controller establishes and maintains communication via a data communication channel. The query module may be coupled to the data controller and receives the notification from the API module, formulates an information request including the telephone number of the calling device, establishes a connection with the data controller to transmit the information request via a data communication channel. The query module also receives the obtained requested information via the data communication channel. The obtained requested information may include customized information related to the calling device. In some embodiments the mobile device may further include an information selector to define the type of information request to be sent. In other embodiments the mobile device may include a display selector to generate a user interface which receives user input to select options for displaying the obtained requested information.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description, it will become apparent to one skilled in the art how to implement the invention in various alternative embodiments and alternative applications. Although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

Figure 1:
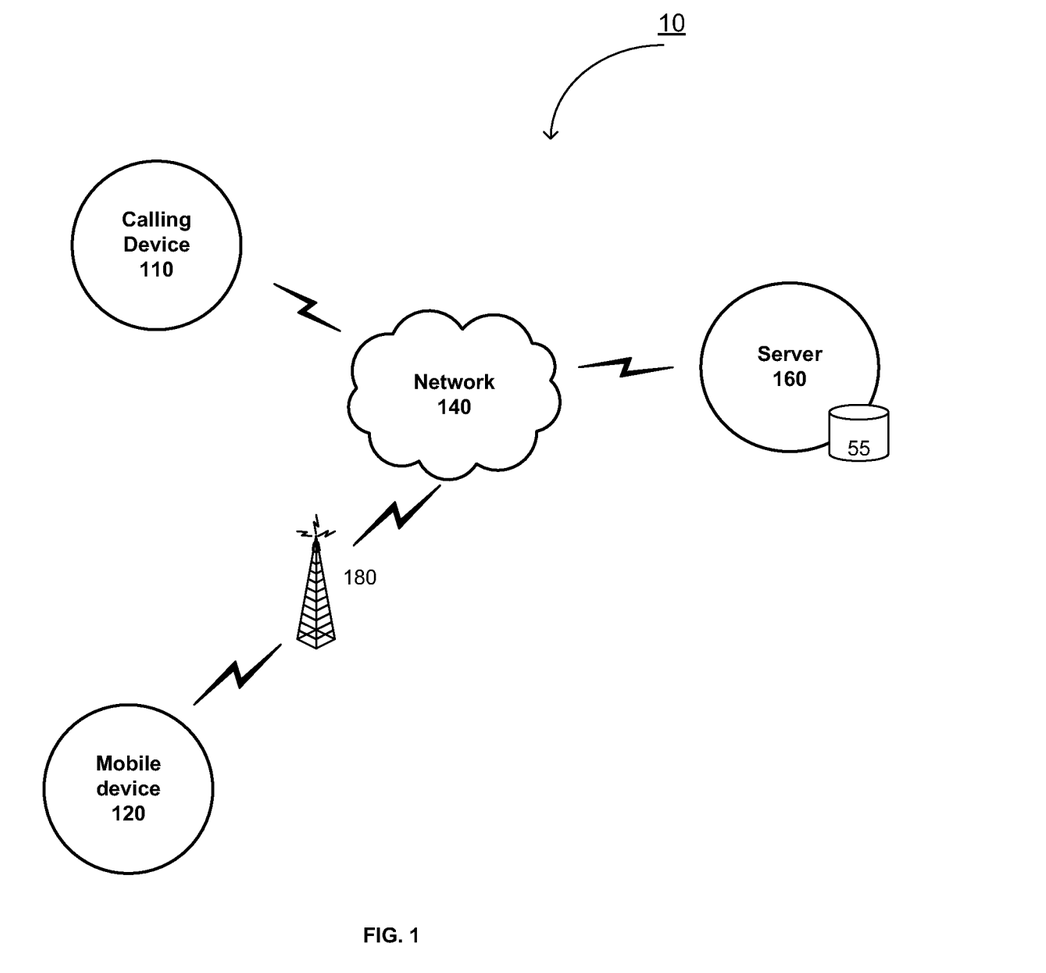
FIG. 1 is a high-level network diagram illustrating an example wireless system according to an embodiment.

In one aspect, a system and method for providing enhanced information to a mobile device is provided. FIG. 1 is a high-level network diagram illustrating an example communication system according to an embodiment. In general, one embodiment of the wireless system 10 includes a mobile or wireless device 120, a calling device 110, a network 140, a query server 160, a wireless base station 180 and storage device 55. The mobile device 120 communicates with the query server 160 via a wireless base station 180 and a network 140. The network 140 can be a combination of multiple communication networks.

The mobile device 120 can be any sort of device with the ability to communicate within the wireless communication network 10. The mobile device 120 may also include a persistent storage area. For example, the mobile device 120 may be a cell phone, a personal digital assistant ("PDA"), a portable computer with wireless connectivity (e.g. a laptop computer) or any other device configured for wireless communication. Calling device 110 can be any sort of device with the ability to communicate within the communication network and initiate a call with the mobile device 120. For example, the calling device 110 can be a mobile device 120, a wired computer or a plain old telephone.

The mobile device 120 and the wireless base station 180 can communicate by sending packets of information back and forth. Communications between the mobile device 120 and the wireless base station 180 can be governed by one or more protocols or standards such as Personal Communication Services ("PCS"), Global System for Mobile Communications ("GSM"), Code Division Multiple Access ("CDMA"), Wireless Fidelity ("WiFi"), Worldwide Interoperability for Microwave Access (WiMAX), Bluetooth, Voice Over Internet Protocol (VOIP), Wireless VOIP, Session Initiation Protocol (SIP) and other future protocols or standards, for example, Long Term Evolution (LTE). In one embodiment, the mobile device has the ability to communicate over a telephony channel (or voice communication channel) and a data communication channel at the same time. In some embodiments a single network can be utilized to carry voice and data information. Thus the mobile device can communicate both voice and data information over the single network at the same time.

Query server 160 can be implemented as a single computer or as a plurality of servers logically arranged. The multiple servers can be located in different locations and may support multiple protocols such as an ASCII GET data protocol, SS7 protocol, web services protocol, Voice Over Internet Protocol (VOIP), Wireless VOIP, Session Initiation Protocol (SIP) and other protocols. In the illustrated embodiment, query server 160 is coupled with a data storage area or system 55. The function of the query server 160 is preferably to receive requests or queries from the mobile device 120 and respond to those requests or queries by providing the mobile device 120 with information.

In one embodiment the mobile device 120 receives a call from the calling device 110. The call is transmitted and processed by the network 140, for example, a telecommunications network including a Local Exchange Carrier (LEC) network and Long Distance Carrier (LDC) network. When the call is initiated by the calling device 110, the calling device identification information or source identification number, for example the caller's telephone number can be determined by the network 140. The caller's telephone number can be determined through a process called Automatic Number Identification (ANI), which the network 140, for example a telecommunications network, automatically performs when a caller initiates a call.

The mobile device 120 receives a call signal or call initiation signal (from base station 180) which includes the calling device identification information or number (e.g. telephone number). The mobile device 120 then transmits a query to the query server 160. The query includes the calling device identification information or identifier. In response, the query server 160 processes the query and transmits information to the mobile device 120. The information received by the mobile device 120 can be displayed on the mobile device 120. The information transmitted by the query server 160 can be, for example, the caller's name. In an embodiment, the information is received before the call is answered at the mobile device 120.

In some embodiments the mobile device 120 can be coupled to the network 140 via both a voice communication channel and a data communication channel. In those embodiments, the network 140 can include a telephony network and the internet. The voice communication channel can be a channel (i.e., a communication link or circuit) suitable for the transmission of speech data such as a cellular telephone communication channel. The data communication channel can be a communication channel or circuit provided for the exchange of data. The mobile device 120 can communicate with the query server 160 via the data communication channel. In some embodiments the query server 160 has no connection to the voice communication channels. Thus the incoming call may be received via a telecommunications network and a query or request from the mobile device 120 can be transmitted over a second network link, for example the data communication channel including the internet, to the query server 160. In other embodiments the mobile device 120 can use a single network to carry voice and data.

It should be noted that many components that are included in the elements of FIG. 1 and the subsequent figures have been omitted to make the descriptions more clear. One will note that these omitted elements such as additional base stations, networks, processors, network ports, memories, buses, transceivers, etc., would be included in such elements in a manner that is commonly known to those skilled in the art.

Figure 2:
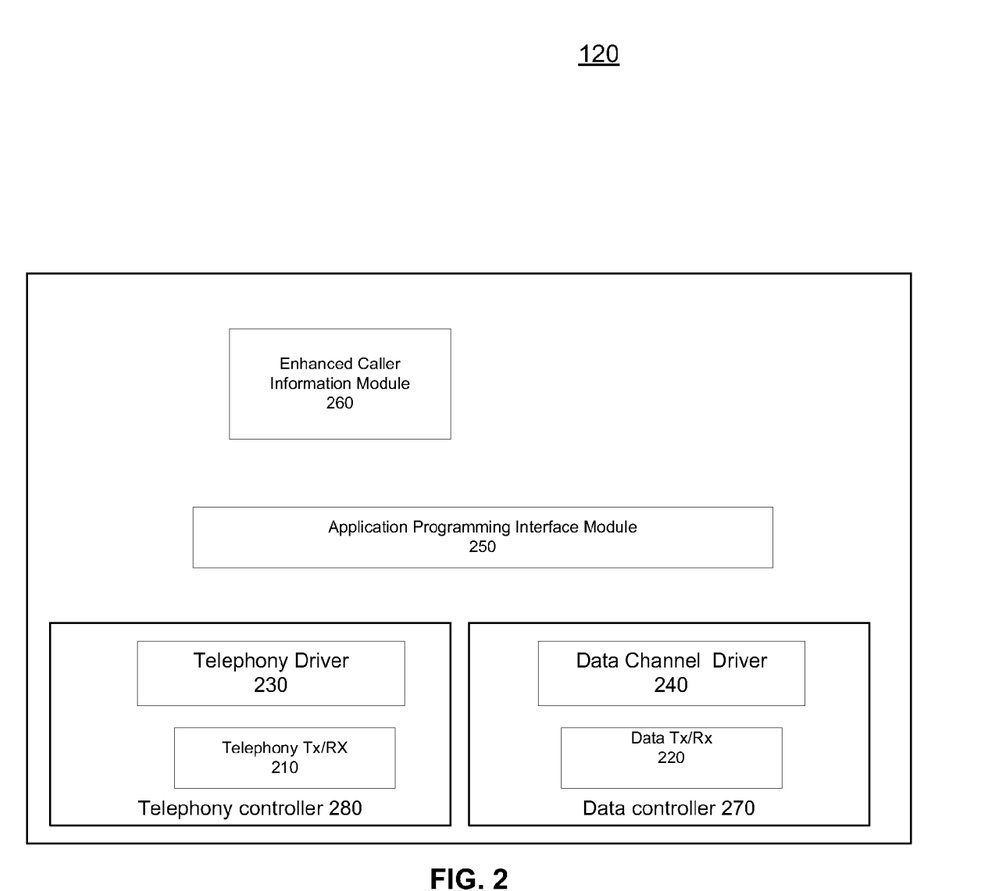
FIG. 2 is a block diagram illustrating selected functional element of a mobile device according to an embodiment.

FIG. 2 is a block diagram illustrating selected functional element of a mobile device according to an embodiment. The mobile device 120 can be commercially available mobile communication device with voice and data communication capabilities with the enhancements described herein. In the illustrated embodiment, the mobile device 120 includes a telephony controller 280, a data controller 270, an Application Programming Interface (API) module 250 and an Enhanced Caller Information Module (ECIM) 260. Other functional elements typically included with such a mobile device have been omitted for clarity.

The telephony controller 280 includes a telephony transceiver 210 and a telephony driver 230. The telephony transceiver 210 in combination with the telephony driver 230 handle typical cellular telephone functions, including, for example, registration, call set up and hand-off. The data controller 270 includes a data transceiver 220 and a data channel driver 240. The data transceiver 220 in combination with the data channel driver 240 handle data communication functions. For example, the functions associated with establishing and using a WiMAX or WiFi network for internet access. The API module 250 provides an interface for applications, such as the ECIM 260, to interact with low level functions such as hardware drivers (e.g., telephony driver 230 and the data channel driver 240). The API module (or functionality) 250 can be provided by a mobile operating system, for example, Windows Mobile 5.0, a BREW (binary runtime environment for wireless), JAVA, Linux, Microsoft Mobile, or other API and may use features and functions available on the mobile device 120 not available through such API(s).

The ECIM 260 receives notification from the API module 250 when a request for an incoming call is received by the telephony controller 280. The ECIM 260 also generates an information request as will be described in more detail below. The ECIM 260 can be a plug-in application that is downloaded to the mobile device 120 from a website, for example. The website can be provided by the query server 160 or a separate server. The plug-in application can be downloaded wirelessly or via a personal computer ("PC"), for example.

Figure 3:
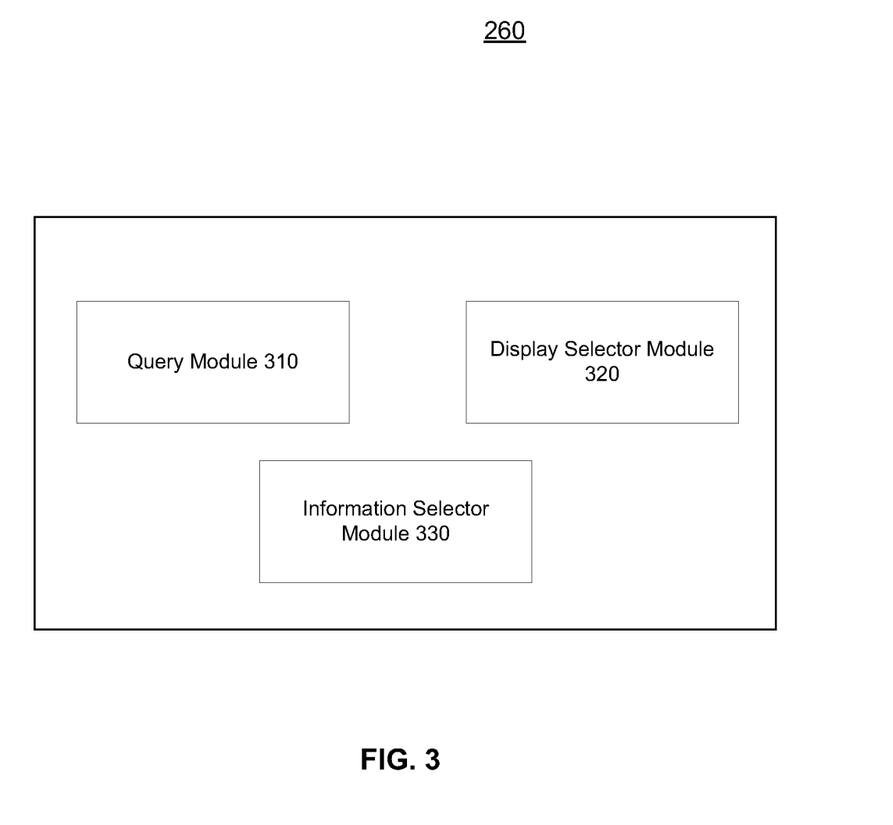
FIG. 3 is a block diagram of an Enhanced Caller Information Module according to an embodiment.

FIG. 3 is a functional block diagram of the Enhanced Caller Information Module 260 of FIG. 2 according to an embodiment. For explanatory purposes, FIG. 3 will be discussed with reference to the device depicted in FIG. 2. The Enhanced Caller Information Module 260 includes a query module 310, a display selector module 320, and an information selector module 330. The query module 310 receives notifications from the API module 250 illustrated in FIG. 2 above. For example, the query module 310 can receive a notification from the API module 250 when a request to initiate an incoming call is received by the mobile device 120. The query module 310 can also generate information requests and transmit the request via the data channel established and maintained by the data controller 270. The data connection or channel can be an ongoing data connection for the mobile device 120 or can be established to communicate information request from the query module 310 as needed.

The display selector module 320 selectably determines whether information received at the ECIM 260 is displayed or stored by the mobile device 120. The display selector generates a user interface which receives user input to select options for displaying and/or storing obtained requested information. For example, a user may select to display only portions of the requested information received at the ECIM 260, to display the entire information received or to save the received information in memory.

The information selector module 330 defines the type of information request to be sent. In one embodiment the information selection module 330 generates a user interface which receives user input to select options for the type of information to be requested. In other embodiments the selection is made when the ECIM 260 is downloaded to the mobile device 120. The user can select to request at least a portion of information relating to the calling device, for example, or decline such a request as a call is being received. That allows a user to decide for which incoming call to request information.

Figure 4:
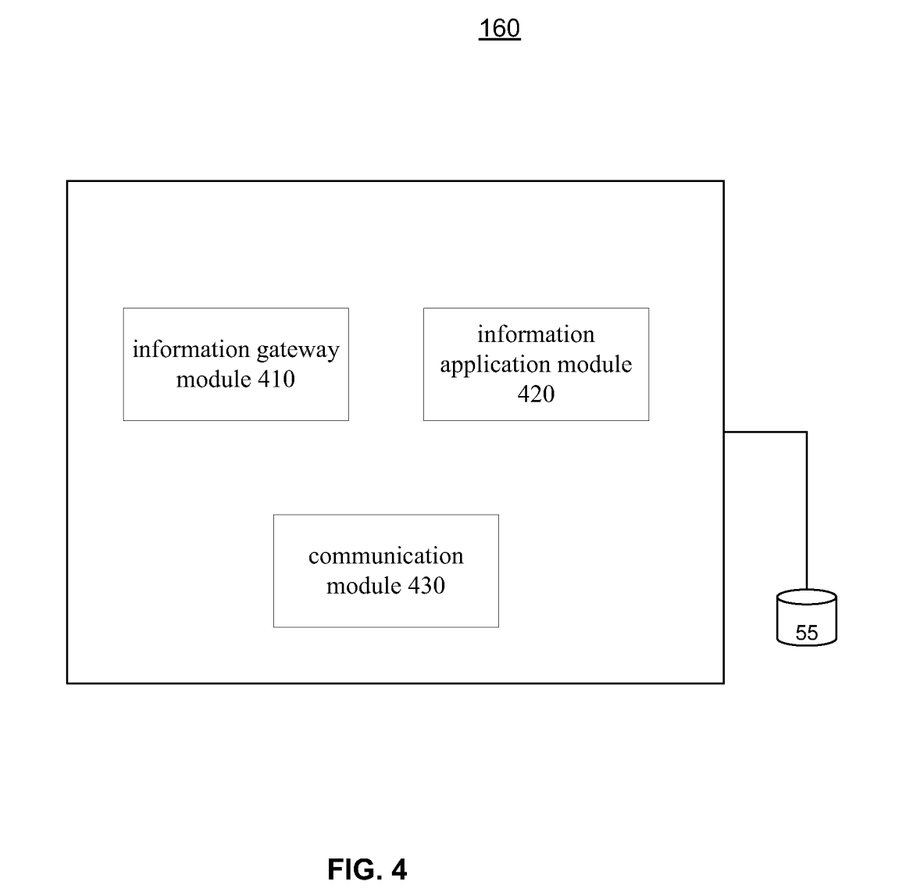
FIG. 4 is a block diagram of a query server according to an embodiment.

FIG. 4 is a functional block diagram of the query server 160. For explanatory purposes, FIG. 4 will be discussed with reference to the above-discussed FIG. 1. The query server 160 may include an information gateway module 410, an information application module 420 and a communication module 430. As was noted above the query server can be implemented as one or more servers or computers. As illustrated in FIG. 1, the query server 160 may be coupled to the storage device 55. In some embodiments the storage device 55 is incorporated into the query server 160. One embodiment of a system that can be used to implement the server 160 and storage device 55 is described in U.S. Pat. No. 7,167,907 hereby incorporated by reference.

The storage device 55 stores information relating to caller devices (and users of caller devices). For example, the storage device can include a list of names indexed by telephone numbers. In one embodiment, the information is telecommunications carrier independent records. In one embodiment the calling device identification number includes a telephone number of the calling device 110. The database or storage device 55 may include a virtual telephone number database including a master list of telephone numbers with thousands of attribute data items. The database or storage device may be updated frequently by querying, for example the SS7 network, for wireless telephone numbers from wireless carriers.

The information gateway module 410 can be coupled to the storage device 55 and configured to receive a query or request for information from devices such as the mobile device 120 over a data communication channel. The query or request for information can include a calling device identification number or identifier, for example, telephone number of the calling device 110, an indication of the information requested and an identifier of the requesting party. The information gateway module 410 authenticates the requester of information and can also perform billing functions such as tracking requests by customer or subscriber. In one embodiment the information gateway module 410 authenticates the requester by accessing a verification file or table to validate the requester. The verification table may include a list of telephone numbers and names associated with the requester, where the requester is, for example, a mobile device and/or subscriber.

The information application module 420 is coupled to the information gateway module 410 and receives the calling device identification number of the calling device 110 from the information gateway module 410. The information application module 420 accesses the records in the storage device 55 using the calling device identification number to obtain the requested information pertaining to the calling device 110 or the calling party. In some embodiments the calling device identification number is associated with the requested information via an algorithm that uses the calling device identification number to compute the location in memory of requested information in the storage device.

The communication module 430 is coupled to the information application module 420 and transmits the requested information (data) pertaining to the calling device via the data communication channel. Alternatively the response to the request can be sent as a short message service (SMS) communications protocol message that allows the interchange of short text messages between mobile devices 120 or an email. The response to the request can also be sent as a (VOIP), Wireless VOIP, Session Initiation Protocol (SIP) etc. In some embodiments a single network can be utilized to carry voice and data information. Thus the voice communication can be received over the single network and the request for information and response can also be transmitted and received by the mobile device 120 over the single network.

Figure 5:
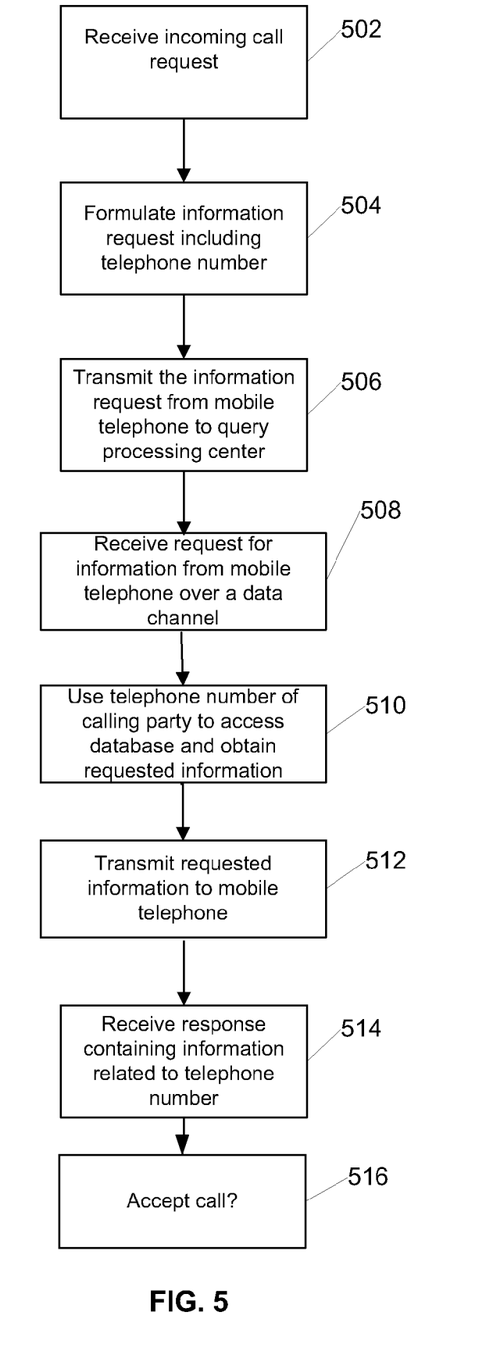
FIG. 5 is a flow diagram of a process of providing enhanced information to a mobile telephone regarding a calling device according to an embodiment.

FIG. 5 is a flow diagram of a process of providing enhanced information to a mobile telephone regarding a calling device according to an embodiment. The steps of this process may be implemented in the mobile device 120 of FIG. 2 and the query server 160 of FIG. 4. The steps of the process can be performed in "real time," after the caller has initiated a call from the calling device 110 and while the call is still active or before the voice connection is completed.

At step 502 the process starts with receiving an incoming call request at the mobile device 120 including the telephone number (or identifier) of the calling device. The calling party may initiate the call from the calling device 110 illustrated in FIG. 1 above. When the call is received at the mobile device 120 illustrated in FIG. 1, the ECIM 260 is notified of the call by the API module 250. The notification may include forwarding the telephone number of the calling device to the ECIM 260.

The process then continues to step 504 where an information request is formulated including the telephone number of the calling device. In some embodiments the information selector module 330 can prompt the user to select between several options including whether to request information or to specify the type of information desired by the user in relation to the calling device before the query is completed. Thus a user may select to request the name or email of the calling party and not the address of the calling party, for example. The request may include a user identifier or license ID, a request ID, a service key and a return network address. The return network address can include, for example, a phone number or an internet protocol address. The service key may be the calling device identification number. The user or license ID may be linked to the calling device identification number or network address of the mobile device that may be obtained during a registration process. The user or license ID may be included as part of a downloadable plug-in ECIM application. The number of queries afforded to a user may be limited by the license available to the user. For example, the license may be limited based on how many queries a user can make during the license period or may have duration constraints.

In step 506 the request from the mobile telephone 120 is transmitted to a query processing center via the data communication channel. The query processing center includes a query server 160, illustrated in FIG. 1 above, for processing the request and obtaining a response. At step 508 the request is received at the query processing center. The process then continues to step 510 where the telephone number of the calling device is used to access the database or storage device to verify the user's license and to obtain the requested information. The information obtained being the requested information pertaining or relating to the calling device. In step 512 the requested information obtained from the database is transmitted to the mobile phone via the data communication channel (or by SMS or email). In step 514 the requested information is received by the ECIM 260. In one embodiment, the user can accept or reject the call based on the information received in step 516.

Those of skill will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method for providing enhanced information to a mobile telephone regarding a calling device, the method comprising:
   receiving a selection of one or more types of information from a plurality of types of information at a mobile telephone;
   receiving an incoming call request at the mobile telephone including an identifier of the calling party;
   formulating an information request related to the calling party, the information request including the identifier of the calling party, an indication of the one or more selected types of information, and an identifier of a license, wherein the license limits the information request;
   transmitting the information request from the mobile telephone to a query processing center via a data communication channel; and
   receiving a response including the one or more selected types of information for the calling party at the mobile telephone via the data communication channel.

2. The method of claim 1, further comprising displaying the one or more selected types of information for the calling party on a display of the mobile telephone.

3. The method of claim 1, wherein the one or more selected types of information for the calling party comprise the name of the calling party.

4. The method of claim 1, further comprising storing the one or more selected types of information for the calling party in a storage system of the mobile telephone.

5. The method of claim 1, further comprising accepting a call based on the response.

6. A method of providing enhanced information to a mobile telephone regarding a calling device wherein the mobile telephone receives the identifier of a calling device, the method comprising:
   updating a database by querying a plurality of wireless carriers for information related to a plurality of calling devices;
   receiving a first request for information from a first mobile telephone over a data communication channel, the first request including an identifier of a first one of the plurality of calling devices, a first indication of one or more types of information selected from a plurality of types of information by a user of the first mobile telephone, and an identifier of a license;
   verifying the identified license;
   limiting requests for information from the user based on the identified license;
   using the identifier of the first calling device to access the database and obtain first requested information, the first requested information including a first customized information associated with the first calling device, the first customized information comprising the one or more selected types of information; and
   transmitting the obtained first requested information to the first mobile telephone via the data communication channel while the first mobile telephone is in connection with the first calling device.

7. The method of claim 6, wherein the first requested information includes an identifier of a calling party.

8. The method of claim 6, further comprising associating the first requested information with the first calling device's identifier via an algorithm that computes the location in memory of the first requested information.

9. The method of claim 6, further comprising accessing a verification table to authenticate the source of the first request.

10. A method for providing enhanced information to a mobile telephone regarding a calling device, the method comprising:
    receiving a first information request from a first mobile telephone at a query processing center via a data communication channel, the first information request including an identifier of a first calling device, a first indication of one or more types of information selected from a plurality of types of information by a user of the first mobile telephone, an identifier of the user, and an identifier of a license, wherein the license limits the first information request;
    updating a database by querying a wireless carrier for information related to the first calling device;
    using the identifier of the first calling device to access the database and obtain first information comprising the one or more selected types of information related to a user of the first calling device;
    transmitting the first information to the first mobile telephone via the data communication channel;
    tracking the first information request; and
    billing the user for the first information request.

11. The method of claim 10, wherein the one or more selected types of information comprise the name of the calling party.

12. The method of claim 10, further comprising associating the one or more requested types of information with the first calling device's identifier via an algorithm that computes the location in memory of the one or more requested types of information.

13. The method of claim 1, further comprising generating a user interface, wherein the selection of one or more types of information is received from a user of the mobile telephone via the user interface.

14. The method of claim 13, wherein receiving a selection of one or more types of information is performed after receiving the incoming call request and before the incoming call request is accepted or declined.

15. The method of claim 13, wherein the user interface comprises a selectable option for each of the plurality of types of information.

16. The method of claim 13, wherein the user interface comprises an option to accept or decline formulation and transmission of the information request.

17. The method of claim 1, wherein the plurality of types of information comprises two or more of a name, picture, email, and address.

18. The method of claim 1, wherein the one or more selected types of information comprises two or more selected types of information.

19. The method of claim 6, further comprising:
receiving a second request for information from a second mobile telephone, the second request including an identifier of a second one of the plurality of calling devices and a second indication of one or more types of information selected from the plurality of types of information by a user of the second mobile telephone, wherein the second indication is of one or more types of information that are different than the one or more selected types of information of the first indication;
using the identifier of the second calling device to access the database and obtain second requested information, the second requested information including a second customized information associated with the second calling device, the second customized information comprising the one or more types of information that are different than the one or more selected types of information of the first customized information; and
transmitting the second requested information to the second mobile telephone.

20. The method of claim 6, wherein the one or more selected types of information comprises two or more selected types of information.

21. The method of claim 10, further comprising:
receiving a second information request from a second mobile telephone, the second information request including an identifier of a second calling device and a second indication of one or more types of information selected from the plurality of types of information by a user of the second mobile telephone, wherein the second indication is of one or more types of information that are different than the one or more selected types of information of the first indication;
using the identifier of the second calling device to access the database and obtain second information comprising the one or more types of information that are different than the one or more selected types of information of the first information; and
transmitting the second information to the second mobile telephone.

22. The method of claim 10, wherein the one or more selected types of information comprises two or more selected types of information.

23. The method of claim 6, wherein limiting requests for information from the user comprises limiting one or more of a number of requests for information afforded to the user and a time period during which the user may receive requested information.

* * * * *